R. CASSIDY.
REEL.
APPLICATION FILED APR. 15, 1921.

1,394,276. Patented Oct. 18, 1921.

WITNESSES
Alfred Krafft
S. W. Foster

INVENTOR
ROBERT CASSIDY
BY
ATTORNEYS

UNITED STATES PATENT OFFICE.

ROBERT CASSIDY, MANSFIELD, OHIO.

REEL.

1,394,276. Specification of Letters Patent. Patented Oct. 18, 1921.

Application filed April 15, 1921. Serial No. 461,732.

*To all whom it may concern:*

Be it known that I, ROBERT CASSIDY, a citizen of the United States, and a resident of Mansfield, in the county of Richland and State of Ohio, have invented a new and Improved Reel, of which the following is a full, clear, and exact description.

This invention relates to improvements in reels, and more particularly to reels designed for use in connection with clotheslines and the like, an object of the invention being to provide a device of the character stated, which will permit the clothesline to be reeled or unreeled without any portion of the line coming in contact with the ground to soil the same.

A further object is to provide a reel which is portable and can be conveniently supported in one hand and manipulated by the other hand to wind or unwind a clothesline or other similar device.

A further object is to provide a reel of the character stated which can be manufactured at an extremely low price, which will be relatively small and compact, which will be neat and attractive in appearance, and strong and durable in use.

With these and other objects in view the invention consists in certain novel features of construction, and combinations and arrangements of parts, as will be more fully hereinafter described and pointed out in the claim.

In the accompanying drawings—

Figure 1:
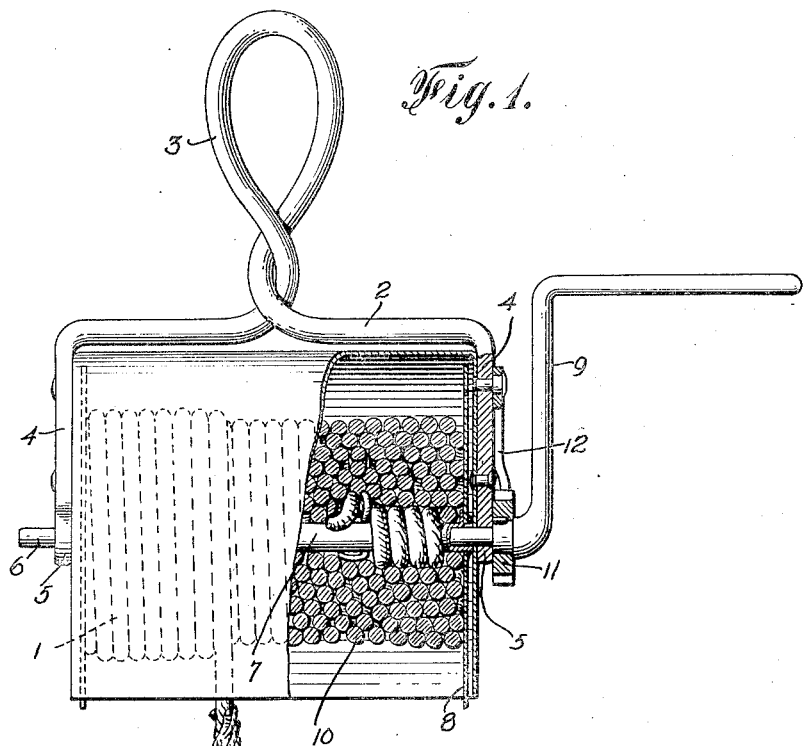
Figure 1 is a plan view partly in section, illustrating my improved reel.
Figure 2:
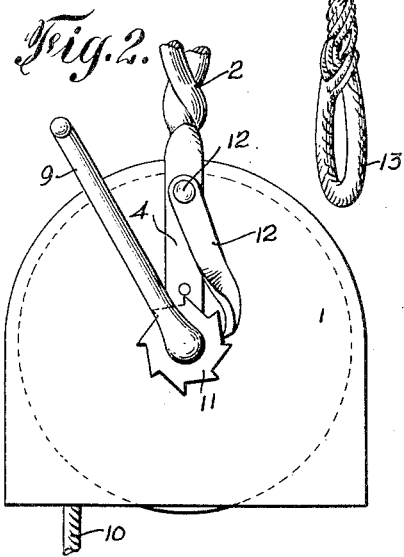
Fig. 2 is a view in end elevation.

My improved reel is provided with a casing 1 of general semi-cylindrical shape open at one end, and 2 is a bail having an eye 3 at its intermediate portion and having its ends 4 riveted or otherwise secured to the ends of the casing 1. The extreme ends of the bail are enlarged and perforated forming bearings 5 for a shaft 6, and this shaft 6 projects through the tubular sleeve of a spool or drum 7, the latter having end disks 8 as shown.

A crank 9 is fixed or integral with one end of the shaft 6 and as the spool or reel 7 is fixedly secured to said shaft in any approved manner, the manual turning of the crank will cause a rotary motion to be imparted to the reel to wind the line 10 thereon, one end of said line 10 being secured to the reel in any approved manner.

A ratchet wheel 11 is fixed to the shaft 6 outside of the casing 1 and a pawl 12 is pivotally connected to one end 4 of the bail 2 and at its free end engages the ratchet wheel 11 to hold the reel against turning movement in one direction, as will be readily understood.

Figure 3:
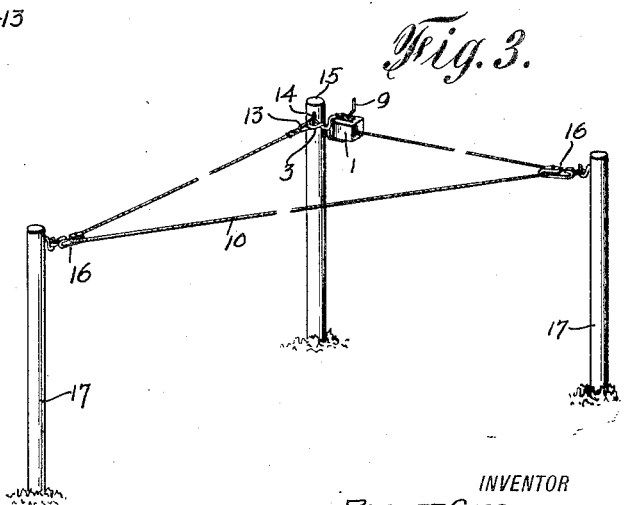
Fig. 3 is a perspective view illustrating the application of my improved reel to a clothesline.

In Fig. 3 I illustrate the clothesline 10 as provided at one end with an eye 13 engaging over a hook 14 on a post 15. The intermediate portions of the line 10 engage pulley blocks or other suitable devices 16 on posts 17, and the opposite end of the line is secured to the reel, as above explained, with the eye 3 of the reel engaged over the hook 14.

With the parts in the position shown in Fig. 3, the line can be made as taut as desired by turning the crank 9, the pawl 12 operating to engage the ratchet wheel 11 and hold the reel in any position of adjustment. When it is desired to release and remove the line, the eye 3 of the reel is disengaged from hook 14, and while the operator holds the casing 1 in one hand, he can turn the crank 9 to wind the line on the reel until he reaches the extreme end of the line without any danger of the line falling to the ground and becoming soiled by such contact.

While I have illustrated a particular manner of holding a line, it is obvious that the invention is not limited in this particular as the line may be supported in any desired way, and in any position of use it is understood that the reel is to be portable, and when disengaged from its holding means, can be manually held, and the operator moves forwardly winding the line on the reel to prevent its contact with the ground.

In placing the line in position, the operator first attaches the free end of the line and then permits the reel to unwind, holding the line sufficiently taut to prevent contact with the ground, and after the reel is connected, a few turns of the reel will bring the line to a position as taut as may be desired.

Furthermore, it will be noted that when the reel is not in use, it may be suspended by means of the bail, and when so suspended, the casing 1 will act as a hood or protecting device to shield the line from inclement weather and thus lengthen the life of the line.

Various slight changes might be made in the general form and arrangement of the parts described without departing from the invention, and hence I do not limit myself to the precise details set forth, but consider myself at liberty to make such changes and alterations as fairly fall within the spirit and scope of the appended claim.

I claim:

A reel of the character described, comprising a casing having an opening at one end of the maximum width and length of the casing, a bail having its ends secured to the ends of the casing, said bail having bearings in its end, said casing having openings in alinement with the bearings, a spool having disks at its ends, said spool removable through the open end of the casing, a shaft mounted in the bearings and connected to the spool, a crank arm on the shaft, a ratchet wheel on the shaft, a pawl engaging the ratchet wheel, and a line secured at one end to the spool and wound thereon and having its free end movable through the opening of the casing.

ROBERT CASSIDY.